May 6, 1969     L. J. FISCHER ET AL     3,442,471
NOZZLE STRUCTURE
Filed Dec. 27, 1966     Sheet 1 of 2
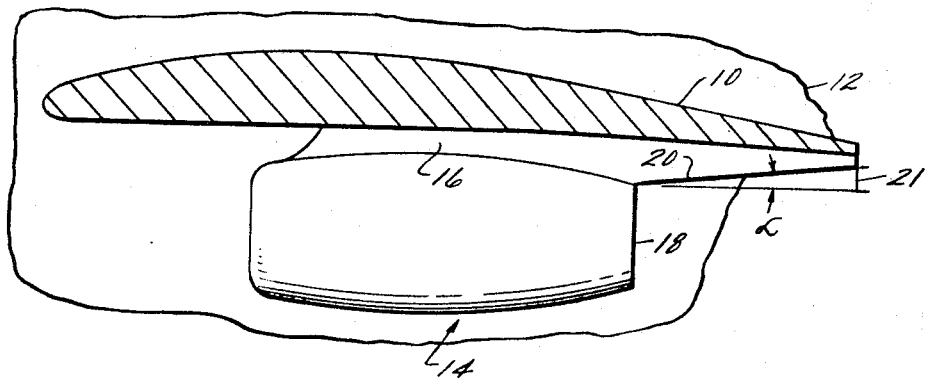
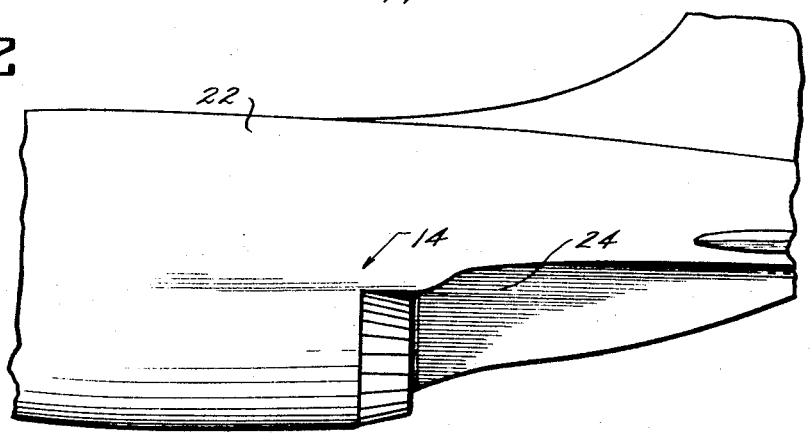
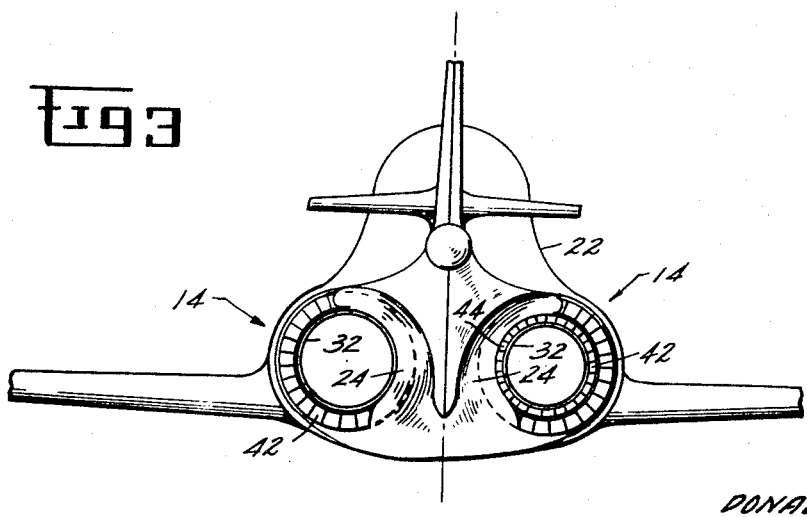
INVENTORS
DONALD P. McHUGH
EDWARD R. BECKER
JOHN T. KUTNEY
LEE J. FISCHER, DECEASED
HELEN M. FISCHER, EXECUTRIX
BY— *John F. Pullen*
ATTORNEY

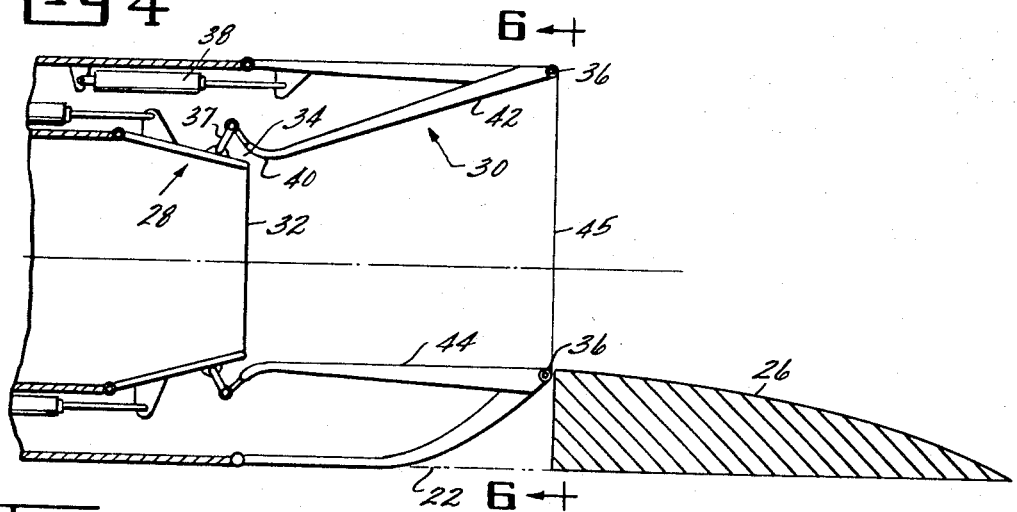
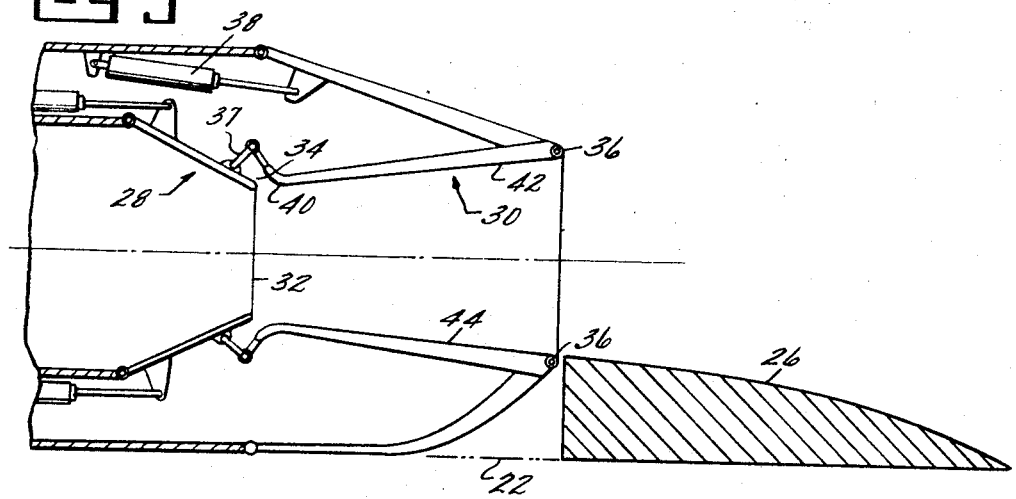
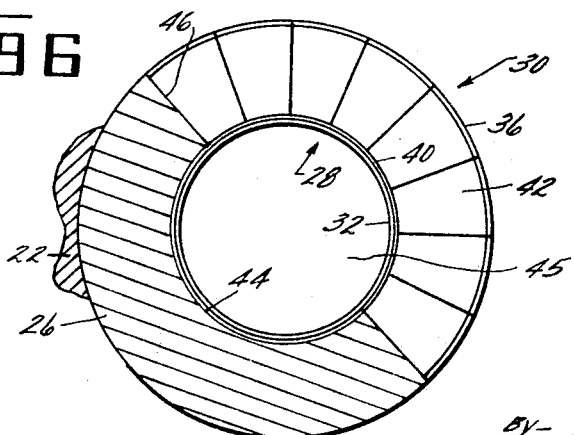
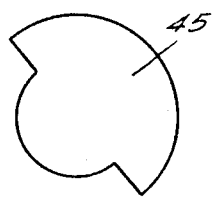
INVENTORS.
DONALD P. McHUGH
EDWARD R. BECKER
JOHN T. KUTNEY
LEE J. FISCHER DECEASED
HELEN M. FISCHER, EXECUTRIX
BY ATTORNEY

# United States Patent Office 3,442,471
Patented May 6, 1969

3,442,471
NOZZLE STRUCTURE
Lee J. Fischer, deceased, late of Marblehead, Mass., by Helen M. Fischer, executrix, Marblehead, Mass., and Edward R. Becker, John T. Kutney, and Donald P. McHugh, Cincinnati, Ohio, assignors to General Electric Company, a corporation of New York
Filed Dec. 27, 1966, Ser. No. 607,131
Int. Cl. B64d 29/04, 33/04; B64c 15/08
U.S. Cl. 244—53
8 Claims

ABSTRACT OF THE DISCLOSURE

The invention relates to a jet engine nozzle structure arrangement where an unsymmetrically variable nozzle is used in conjunction with a fixed fairing on the fuselage downstream of the nozzle so that part of the nozzle away from the fuselage is varied and part adjacent the fuselage is fixed to provide a smooth continuous surface for the jet and reduce the base drag on the aircraft.

---

In high speed aircraft and especially aircraft where the jet engine is installed relatively close to an aircraft structural member such as a wing or fuselage, there tends to be interference in the flow from the exhaust nozzle with the adjacent aircraft structure. Many aircraft employ engines in close proximity to the wing and many installations employ dual engines on each side of the fuselage discharging very close or adjacent to the fuselage, the engines being symmetrically disposed on each side of the aircraft longitudinal centerline. The interference is known as base drag and is created by the tendency of the jet, by ejector action, to pump down the area between the jet and the aircraft and create a low pressure zone with a possible overexpansion of the jet. For example, in a fuselage installation, the fixed jet engine exhausts along the engine centerline which diverges from the side of the fuselage in the aft direction because the fuselage angles in towards the aircraft centerline. The angling creates an area which is subject to pumping down by the jet and results in base drag on the aircraft. This angling in is usually referred to as the boat-tail angle and the aircraft structural surface formed by one side of the angle is the surface which is subject to low pressure or pumping down and its projected area is a measure of the base drag on the aircraft.

The main object of the present invention is to provide a nozzle arrangement which greatly reduces the base drag on a combination nozzle and aircraft structure by an unsymmetrical nozzle variation.

Another object is to provide a nozzle arrangement so disposed that no pumping down of the adjacent aircraft structural surface occurs to result in base drag.

A further object is to provide a nozzle that produces positive pressure for thrust as opposed to a negative pressure resulting in drag.

Another object is to provide a convergent-divergent nozzle with a primary symmetrically variable area flap nozzle and a secondary unsymmetrical variable area flap nozzle to provide the necessary area variation without the base drag.

Also, an object is to provide such a nozzle in combination with a fixed fairing on the aircraft so that the nozzle portion adjacent the aircraft remains substantially fixed whereas the nozzle portion away from the aircraft is variable.

Briefly stated, the invention is directed to a low base drag nozzle arrangement in an aircraft having an axially extending structural member such as a wing or fuselage. A jet engine is fixedly supported by the member and has nozzle means to discharge along the side of the member generally parallel to the aircraft longitudinal centerline. The nozzle means is unsymmetrically varied. While not so limited, a preferred arrangement will generally include a primary symmetrically variable area converging flap nozzle and a secondary unsymmetrical variable area diverging flap nozzle. The downstream ends of the secondary flaps that are adjacent to the aircraft structural member are fixed and means are provided to vary the remainder of the secondary flaps at their downstream ends to provide a variable area secondary nozzle for controlled expansion. Fixed fairing means are carried by the aircraft member and the fairing means project outward from the member at the upstream end to form a continuous surface with the fixed downstream ends of the secondary flaps. The rest of the fairing means is smoothly faired into the supporting member in a downstream direction to eliminate any space between the downstream ends of the secondary flaps adjacent the structural member and to provide a continuous surface between the secondary flap ends, the fairing, and the support member to reduce drag. In the case of a fuselage, the nozzle arrangement may be duplicated in a symmetrical pair of engines on each side of the fuselage. The upsteam ends of the secondary flaps, in the case of a converging-diverging (C-D) nozzle, may be varied together or in a desired relation at the nozzle throat. Because of the unsymmetrical varying of the secondary flaps, a radial sealing means is disposed between adjacent downstream ends of the fixed and variable secondary flaps.

While the specification concludes with claims particularly pointing out and distinctly claiming the subject matter which is regarded as the invention, it is believed the invention will be better understood from the following description taken in connection with the accompanying drawing in which:

FIG. 1 is a partial schematic drawing of a wing mounted installation illustrating the base drag area;

FIG. 2 is a general partial view of a typical dual engine fuselage installation;

FIG. 3 is a rear view looking forward at the aft end of FIG. 2 illustrating the nozzle operation in two positions;

FIG. 4 is a diagrammatic view of a C-D nozzle in maximum area position;

FIG. 5 is a view, similar to FIG. 4, showing the nozzle in cruise area position;

FIG. 6 is a partial view illustrating the unsymmetrical nozzle exit area looking upstream on line 6—6 in FIG. 4; and FIG. 7 is a diagrammatic view of the unsymmetrical exit area of FIG. 4.

Referring first to FIG. 1, there is shown a general view of an engine installation on an aircraft structural member such as wing 10 that is carried by aircraft 12. Wing 10 extends axially of and fixedly supports an engine 14 by conventional pylon 16 whereby the engine exhausts along the pylon through nozzle 18 longitudinally of the aircraft centerline to provide thrust to the aircraft in a known manner. Where the structural support member extends rearwardly of the nozzle as surface 20 and angles away from the surface, it will be apparent that an angle α is formed between the surface and the centerline of thrust. This surface 20, which is a closely adjacent surface, tends to be evacuated or pumped down by the ejector action of the jet to result in a low pressure area between the surface and the edge of the exhaust jet. Thus, an area projected transversely at 21 creates what is known as base drag on the aircraft engine combination. The angle α, known as the boat-tail angle, should be kept as low as possible to reduce the drag.

Referring next to FIG. 2, a more general installation for the application of the instant invention will be described in detail. However, the principles and structure described are equally applicable to FIG. 1. In FIG. 2, a pair of jet engines 14 are supported by an adjacent aircraft structural member which, for convenience of description, may be fuselage 22. It will be apparent that a single engine may be used and the operation is the same. In the dual engine installations an engine 14 appears symmetrically on opposite sides of the longitudinal centerline of the aircraft as seen in FIG. 3 and only one engine installation need be described since the operation of both is identical. It will be apparent that the installation shown in FIG. 2 results in a jet thrust discharge adjacent the supporting fuselage member parallel to the longitudinal centerline of the engine. The proximity to the fuselage 22 results in a pumping down of the fuselage surface adjacent the jet and a possible over-expansion of the jet and high base drag. Generally the installation as shown in FIG. 3 indicates the area 24 of the fuselage that is pumped down by the jet exhaust. In the case of generally cylindrical nozzles as described for convenience (the nozzle may be other than cylindrical) this area is semi-cylindrical as shown. Of course, the proximity of the exhaust to the aircraft structure depends on the particular installation and the nozzle to be described would be tailored to that installation. Thus, area 24 may be larger or considerably smaller.

Since the invention is described in connection with a high speed aircraft, it is common to use a converging-diverging or C-D nozzle which is generally well known. The invention is equally applicable to a subsonic converging nozzle with a single set of flaps (e.g. as in FIG. 2) but a dual flap C-D nozzle will be described for convenience.

It will be apparent that any positive pressure along surface 20 in FIG. 1 or the equivalent fuselage surface 24 of FIG. 2 results in thrust on the aircraft whereas negative pressure would result in drag on the aircraft. The amount of pressure is a measure of the aircraft drag, the maximum pressure obtainable being that available in the jet exhaust itself.

In order to overcome the boat-tail drag and the tendency to pump down the area adjacent the support structure, as seen in FIGS. 4 et seq., a filler piece or fixed fairing 26 may be carried by the fuselage 22 and is used to fill in the area 24 in FIG. 3 and to cooperate with the unsymmetrical nozzle to be described.

Referring to FIG. 4, a typical C-D nozzle has a primary symmetrically variable area converging flap nozzle 28 movable by any suitable means not shown in detail. The exhaust from nozzle 28 passes into secondary variable area diverging flap nozzle 30 through throat 32, the secondary nozzle providing for controlled expansion with the converging primary for supersonic operation. Suitable cooling means in the form of annulus 34 may be provided between the upstream end 40 of the secondary flaps of nozzle 30 and the downstream end of the flaps on nozzle 28 in order to bathe the inner surface of the secondary flaps with cooling air.

In accordance with the invention, to reduce drag, the flaps of primary nozzle 28 are symmetrically varied in the conventional manner but the flaps of secondary nozzle 30 are unsymmetrically varied in an unconventional manner in order to cooperate with fixed fairing 26. To this end, the downstream ends of the secondary flaps adjacent the supporting member or fuselage 22 are fixed for rotation about pivot 36 and any suitable actuating means 38 is provided to vary the remainder of the secondary flaps to move their downstream ends and control the unsymmetrical exit area of the nozzle. Thus, it will be seen that the fixed fairing means 26 extends outward at its upstream end from the supporting member or fuselage 22 to form a continuous or smooth surface with the fixed downstream ends of the secondary flaps. The fairing means continues downstream and fairs into the fuselage member to eliminate any transverse space between the downstream ends of the secondary flaps and the adjacent structural member. In other words, a continuous smooth surface is provided between the fixed secondary flap ends, the fairing, and the adjacent structural member so there is no adjacent area to pump down and the drag on the aircraft is thereby considerably reduced.

Referring next to FIG. 5, to provide for nozzle variation under all operating conditions, the nozzle is seen in the cruise position where the exit area is smaller. It can be seen diagrammatically that the upstream ends 40 of the secondary flaps are all varied together by a link 37 or equivalent about pivot 36 along with the downstream ends of the primary flaps in nozzle 28 and the varying is around the full nozzle perimeter at the nozzle throat 32.

Because of the unsymmetrical variation of the diverging secondary flaps in a supersonic nozzle as described or the converging nozzle flaps in the case of a subsonic nozzle, it will be apparent that the nozzle exit area is unsymmetrical as shown in FIG. 6. With the outer downstream portion of the secondary flaps that are away from the structural member 22 being the only flaps that are varied, it will be apparent that these flaps 42 open outwardly whereas the inner fixed flaps 44 do not open. The result is an unsymmetrical opening 45 as shown in FIG. 7. Also it will be apparent that a sealing structure 46 is required between the adjacent fixed flaps 44 and the variable flaps 42. Consequently, a suitable radial sealing means is provided in this area.

The operation of the device is shown in FIGS. 4 and 5 where the two positions of maximum and cruise area nozzle outlet are shown respectively. The fixed inner flaps cooperate at the downstream ends with fairing means 26 to provide a continuous surface and remove any discontinuity resulting in a large reduction in base drag. At the same time, the movement and cooperation in the throat area 32 of the primary and secondary nozzles provides for the necessary nozzle configuration at different flight conditions.

While there have been described preferred forms of the invention, obviously modifications and variations are possible in light of the above teachings. It is therefore to be understood that the invention may be practiced otherwise than as specifically described.

What is claimed is:

1. In an aircraft, a low base drag nozzle arrangement comprising:
  an axially extending aircraft structural member,
  jet engine means supported by said member,
  an unsymmetrically variable area flap nozzle connected to said engine disposed adjacent said member discharging along said member substantially parallel to the longitudinal centerline of the engine to produce thrust,
  said flaps adjacent said member being fixed at their downstream ends,
  means to vary the remainder of said flaps, and
  fixed fairing means continuous with the downstream end of the fixed flaps and fairing into said member to eliminate any transverse space and provide a continuous surface between said fixed flap ends, fairing and member to reduce drag.

2. Apparatus as described in claim 1 where said aircraft structural member is a fuselage and said nozzle arrangement is disposed on each side of said fuselage.

3. Apparatus as described in claim 2 where said nozzle is a convergent-divergent nozzle with upstream symmetrical variable area converging primary flaps and downstream unsymmetrical variable area secondary flaps, the upstrem and downstream ends of said secondary and primary flaps respectively varying together.

4. Apparatus as described in claim 2 having sealing means between adjacent fixed and variable flaps.

5. In an aircraft, a low base drag nozzle arrangement comprising:

an axially extending aircraft structural member, a jet engine fixedly supported by said member and having nozzle means to discharge along said member parallel to the aircraft longitudinal centerline.

said nozzle means including a primary symmetrically variable area converging flap nozzle, a secondary unsymmetrically variable area diverging flap nozzle, the downstream ends of said secondary flaps adjacent said member being fixed, means to vary the remainder of said secondary flaps at their downstream ends, fixed fairing means carried by said member, said fairing means projecting outward from said member at the upstream end to form a continuous surface with said fixed downstream ends of said secondary flaps, said fairing means fairing into said member in a downstream direction to eliminate any space between the downstream ends of said secondary flaps adjacent said member and provide a continuous surface between said fixed secondary flap ends, fairing, and member to reduce drag.

6. Apparatus as described in claim 5 where said aircraft structural member is a fuselage and said nozzle arrangement is disposed on each side of said fuselage.

7. Apparatus as described in claim 6 having means to vary the upstream ends of said secondary flaps with the downstream ends of said primary flaps around the full nozzle perimeter to form the nozzle throat.

8. Apparatus as described in claim 6 having radial sealing means between adjacent downstream ends of said fixed and variable secondary flaps.

References Cited

UNITED STATES PATENTS

| | | | |
|---|---|---|---|
| 2,831,319 | 4/1958 | Geary | 239—265.37 |
| 2,984,068 | 5/1961 | Eatock | 239—265.37 |
| 2,968,149 | 1/1961 | Graham et al. | 244—52 |
| 3,106,372 | 10/1963 | Kutney | 244—52 X |
| 3,271,948 | 9/1966 | Fuller | 244—12 X |

FOREIGN PATENTS 1,029,106  5/1966  Great Britain.

OTHER REFERENCES

Jane's All the Worlds Aircraft (1960–61), Ed. by Taylor, 1961, McGraw-Hill.

MILTON BUCHLER, *Primary Examiner.*

JAMES E. PITTENGER, *Assistant Examiner.*

U.S. Cl. X.R.

239—265.19